Sept. 25, 1923.
W. T. WEST
SEED SAVING MEANS
Filed Nov. 19, 1921
1,468,849
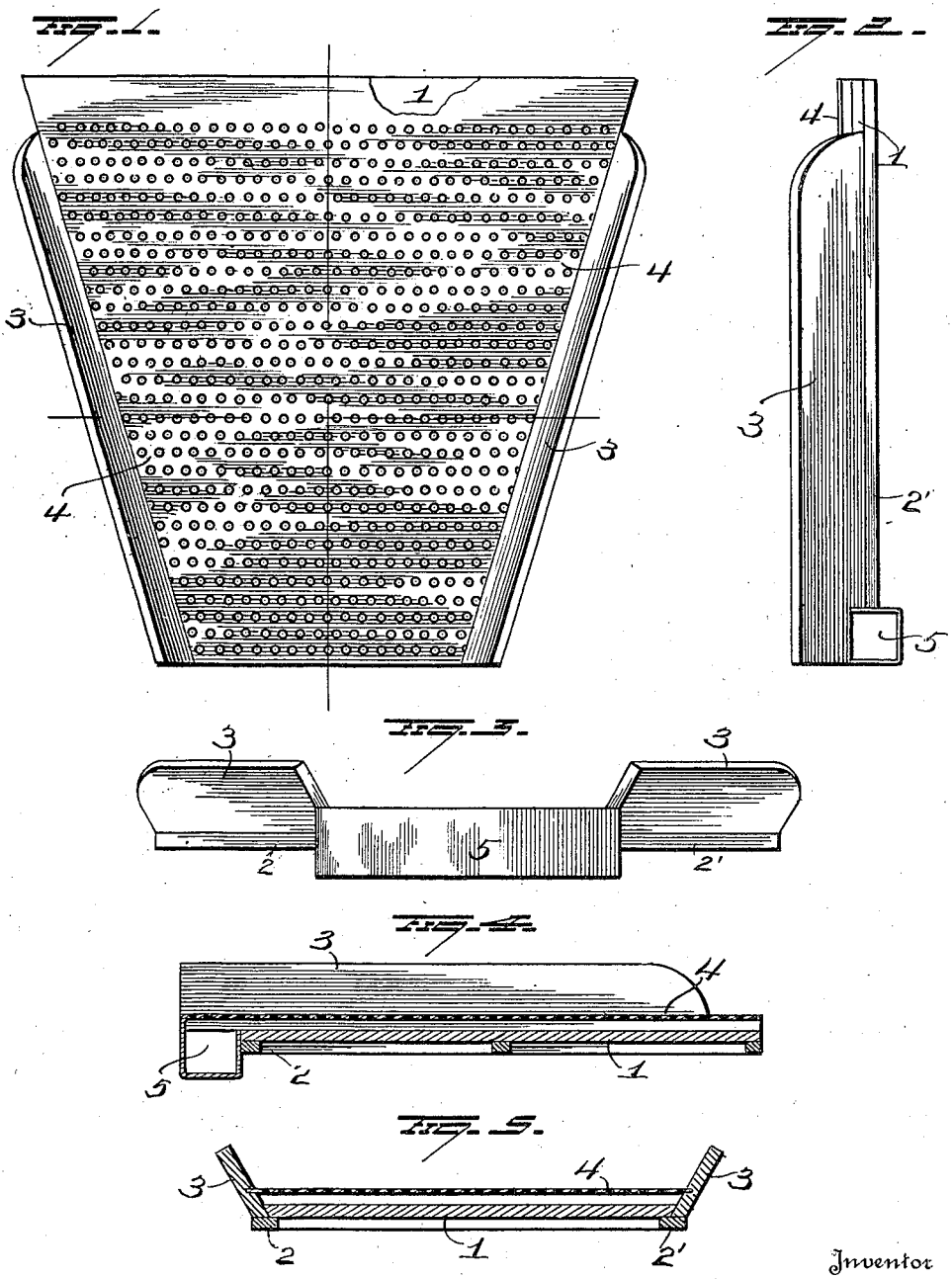
Inventor
W. T. West
By Seymour & Bright
Attorneys Patented Sept. 25, 1923.

1,468,849

UNITED STATES PATENT OFFICE.

WILLIAM TOLIVER WEST, OF DENMARK, TENNESSEE.

SEED-SAVING MEANS.

Application filed November 19, 1921. Serial No. 516,368.

*To all whom it may concern:*

Be it known that I, WILLIAM T. WEST, a citizen of the United States, and a resident of Denmark, in the county of Madison and State of Tennessee, have invented certain new and useful Improvements in Seed-Saving Means; and I do hereby declare the following to be a full, clear, and exact description of the invention, such as will enable others skilled in the art to which it appertains to make and use the same.

This invention relates to seed saving means and more particularly to a device which may be built as a portable structure and operable to save hay seed,—one object of the invention being to provide a device which may be conveniently placed in position to receive hay during the handling of the same and operable to recover such seed as may be jarred or shaken from the hay while the latter may be transferred from one place or receptacle to another.

A further object is to provide a seed saving device which may be placed between a wagon and a baling press so that when hay is being transferred from the wagon to the baling press, seed which may be shaken from the hay will be recovered instead of being lost upon the ground or floor.

With these and other objects in view, the invention consists in certain novel features of construction and combinations of parts as hereinafter set forth and pointed out in the claims.

In the accompanying drawings, Figure 1 is a plan view of a device embodying my invention. Figure 2 is a side view. Figure 3 is an end view. Figure 4 is a longitudinal section view, and Figure 5 is a view in transverse section.

In the drawings, 1 represents a table or platform which may be provided on its under side with cleats 2 and 2'. This table or platform may be suitably supported in an inclined position between a wagon and a baling press, or if desired, said table or platform may be provided with suitable supporting legs so that it may be located,—not only between a wagon and a baling press, but also at any place where hay is being handled.

The table or platform 1 is preferably made tapering in shape as clearly shown in Figure 1 and at its side edges, guards 3—3 are located.

Located between the guards 3—3 and above the upper face of the table or platform 1, is a screen 4 which may consist of a sheet of perforated metal or of wire mesh. The guards 3 and also the screen sheet 4 extend forwardly beyond the smaller or discharge end of the table or platform and under the forward end portion of the screen a seed receptacle 5 is located. This receptacle may be formed by bending the forward imperforate end of the screen sheet into the form of a trough which extends across the discharge end of the device.

It is evident that when hay is discharged upon the screen sheet, it will be guided by the device to the discharge end thereof and at the same time, any seed which may be contained in the hay will be shakened or jarred from the latter so that it will pass through the perforations of the screen sheet and become deposited upon the upper surface of the table or platform, from which latter it will move (by reason of the inclined position in which the table or platform may be disposed) to and become deposited in the box or trough 5, from which latter it may be easily recovered, it being noted that the ends of the trough are open as shown in Fig. 2.

My improvements are eminently useful for saving hay seed when the hay is being transferred from a wagon to a baling press.

Slight changes might be made in the construction of my invention without departing from the spirit thereof or limiting its scope and hence I do not wish to restrict myself to the precise details herein set forth.

Having fully described my invention what I claim as new and desire to secure by Letters-Patent, is:

1. A seed saving device comprising a table, a screen disposed over and spaced from said table and projecting beyond the forward end of said table, and a receptacle at the forward end of the table, one wall of said receptacle having its upper edge approximately coincident with the forward end of the table and having its opposite wall extending upwardly above the plane of the face of the table and to the forward end of the screen, the forward portion of said screen extending over said receptacle.

2. A seed saving device comprising a table, a screen plate disposed above and spaced from the surface of the table and supported by the latter, the forward end portion of the plate being imperforate and extending downwardly rearwardly and upwardly to abut the forward end of the table and constitute a seed receptacle at the forward end of the device.

In testimony whereof, I have signed this specification in the presence of two subscribing witnesses.

WILLIAM TOLIVER WEST.

Witnesses:
P. J. McGehee,
H. F. Neville.